Feb. 5, 1946.  P. L. HEMP  2,394,447
PLATFORM CARRIER FOR AUTOMOBILES
Filed April 9, 1943  2 Sheets-Sheet 1

Inventor
PAUL L. HEMP
By Chas. C. Reif
Attorney

Feb. 5, 1946. P. L. HEMP 2,394,447
PLATFORM CARRIER FOR AUTOMOBILES
Filed April 9, 1943 2 Sheets-Sheet 2
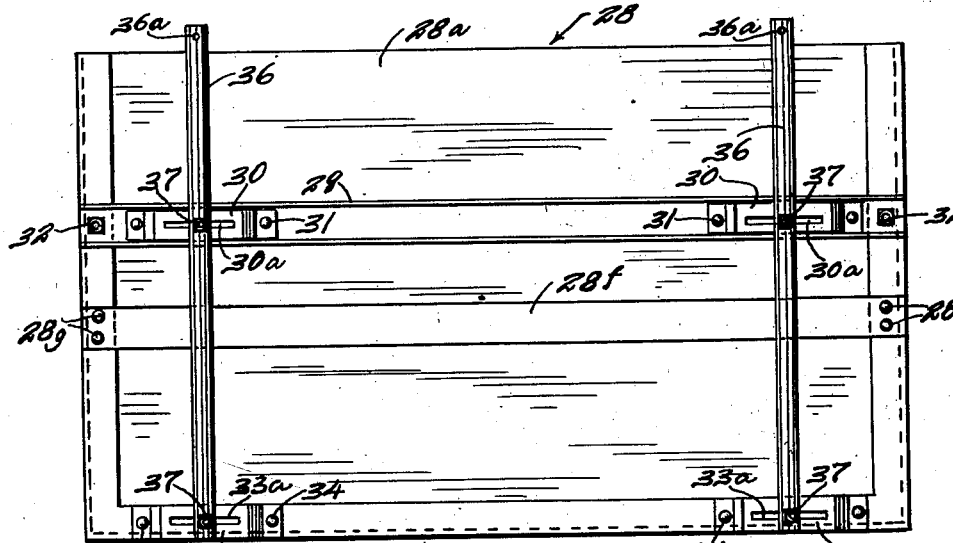
Fig. 4.
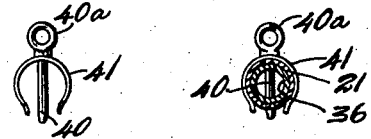
Fig. 8. Fig. 9.
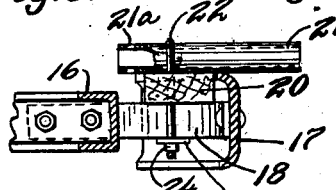
Fig. 6.
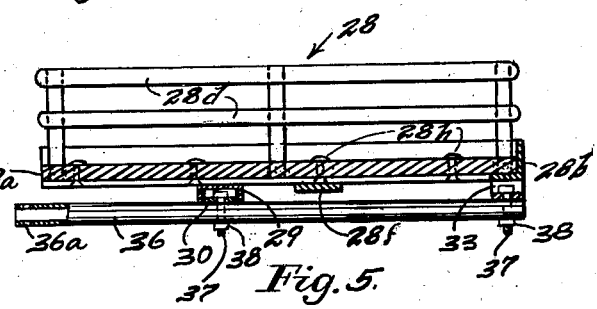
Fig. 5.
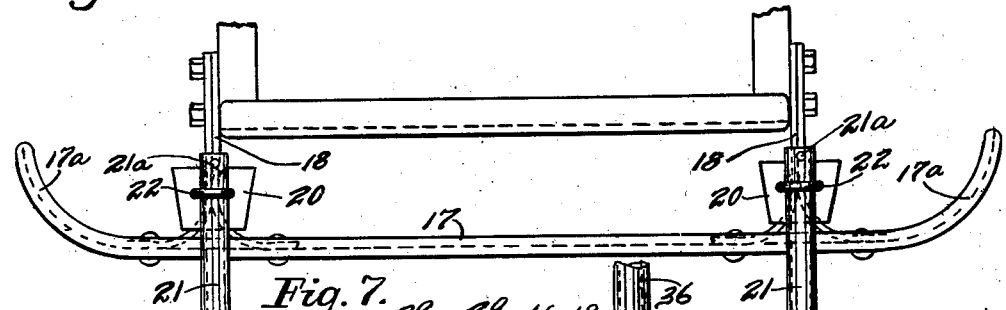
Fig. 7.
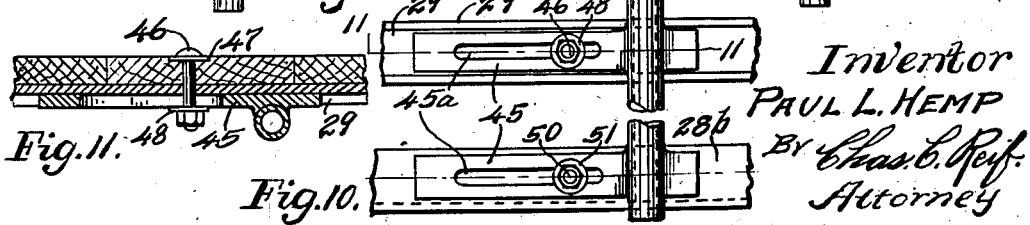
Fig. 11. Fig. 10.
Inventor
PAUL L. HEMP
By Chas. C. Reif.
Attorney Patented Feb. 5, 1946

2,394,447

UNITED STATES PATENT OFFICE 2,394,447

PLATFORM CARRIER FOR AUTOMOBILES

Paul L. Hemp, Rochester, Minn., assignor to General Inventions Corporation, Rochester, Minn., a corporation of Minnesota Application April 9, 1943, Serial No. 482,399

3 Claims. (Cl. 224—29)

This invention relates to a carrier or rack constructed and arranged to be attached to the rear of an automobile, particularly a passenger car.

It is often desirable to transport various articles, luggage, camp outfits, etc., in an automobile and there is usually not sufficient room for such freight in the body of the car or in the trunk now commonly provided. It is desirable therefore, to have an auxiliary carrier which can be easily and quickly attached to the car and which will not in any way damage the car or mar its appearance.

It is an object of this invention therefore, to provide a structure of carrier which can be very quickly and easily attached to the rear of an automobile, which will have a large capacity for carrying various articles, which will not damage or mar the appearance of the automobile and which will be strong, durable and noiseless.

It is a further object of the invention to provide in combination with an automobile having a rear bumper and bumper supports adjacent each end thereof, a tubular member having a rearwardly projecting open end which is rigidly secured to and supported by each of said bumper supports together with a carrier having rigidly secured thereto preferably at the underside thereof a pair of members having free forward ends which are arranged to fit telescopically into said tubular members for supporting said carrier together with means for holding said last mentioned members in said tubular members.

It is a further object of the invention to provide in combination with an automobile having a frame member extending transversely thereof at its rear end and brackets secured to said frame member at either side thereof a carrier structure comprising tubular members secured to and supported by said brackets respectively having rearwardly directed open ends, a rack or carrier having secured thereto and supported by a pair of members having free forward ends adapted to telescopically engage with said first mentioned members to support said carrier together with means to prevent relative movement of said tubular members and last mentioned members.

These and other objects and advantages of the invention will be fully set forth in the following description made in connection with the accompanying drawings in which like reference characters refer to similar parts throughout the several views and in which:

Fig. 4 is a bottom plan view of the carrier;

Fig. 5 is a vertical section taken on line 5—5 of Fig. 1 as indicated by the arrows;

Fig. 6 is a partial view partly in side elevation and partly in vertical section showing the attaching parts;

Fig. 7 is a top plan view of the attaching parts;

Fig. 8 is a view in front elevation of a holding clip;

Fig. 9 is a vertical section taken on line 9—9 of Fig. 1 as indicated by the arrow;

Fig. 10 is a partial bottom plan view of an adjustable structure; and

Fig. 11 is a vertical section on line 11—11 of Fig. 10.

Figure 1:
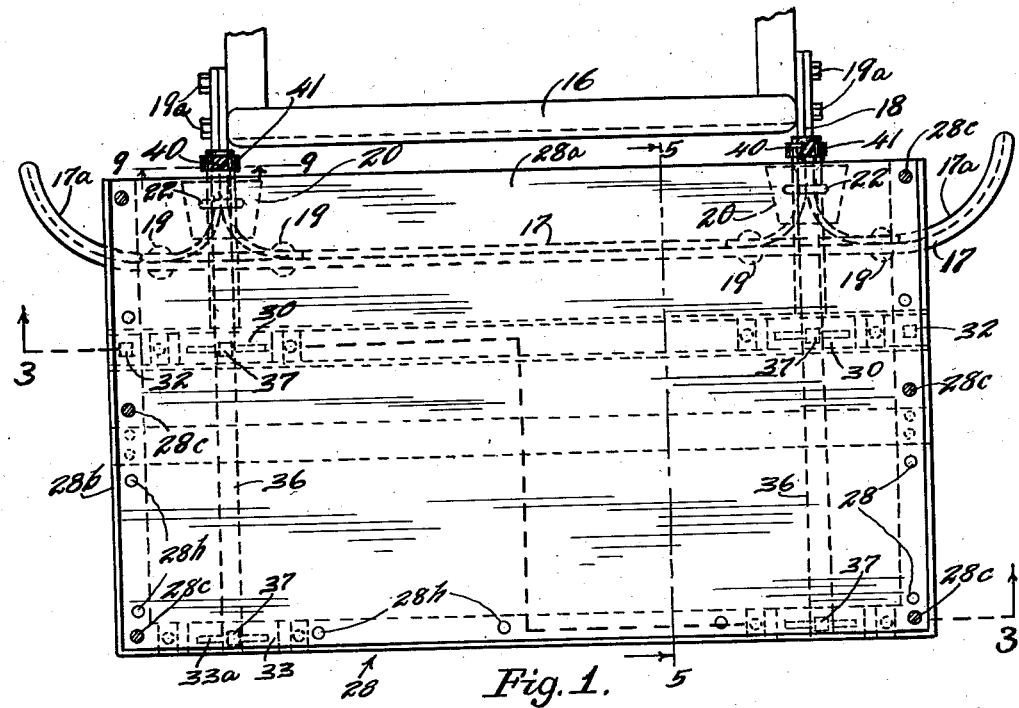
Fig. 1 is a top plan view of the rear portion of an automobile showing the invention applied thereto.
Figure 2:
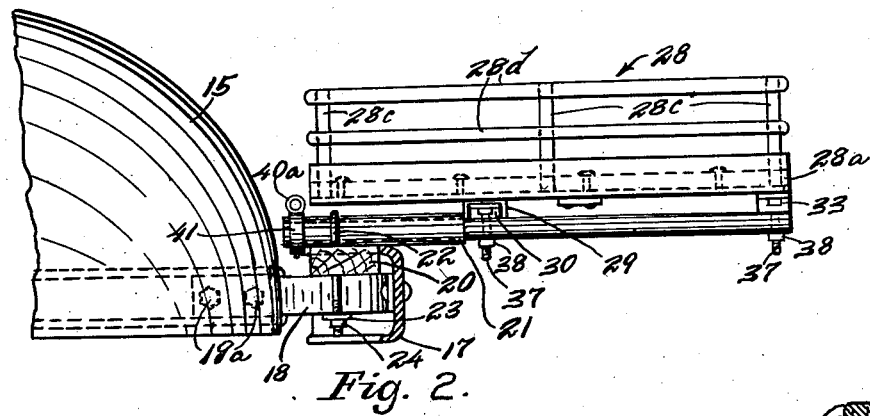
Fig. 2 is a view in side elevation of the device, a portion of the bumper of the automobile being shown in section.
Figure 3:
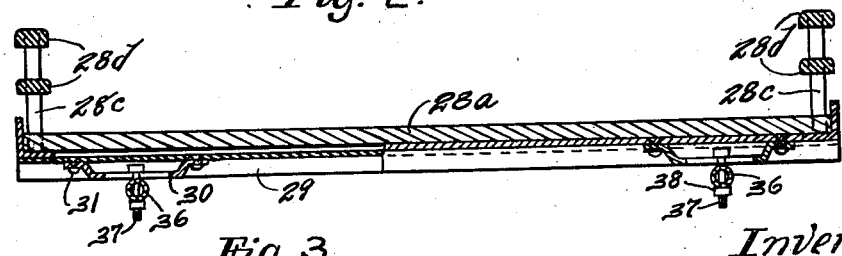
Fig. 3 is a vertical section taken on line 3—3 of Fig. 1 as indicated by the arrows.

Referring to the drawings a portion of an automobile of a modern type of passenger car is illustrated showing a portion of the body at the rear end thereof and the frame member 16 which extends transversely at the rear of the automobile. In practically all types of passenger cars a bumper 17 is provided having a central portion extending substantially parallel to the frame portion 16 and having forwardly curved end portions 17a. This bumper is variously supported from the frame but one common construction is that of having a pair of bars 18 of curved formation having their convex sides adjacent each other secured to the bumper at one end and secured to the frame of the automobile at their other ends. In Figs. 1, 7 and 8 the members 18 are shown as secured by rivets 19 and bolts 19a.

In accordance with the present invention a member 20 is provided and this is located on top of the bumper supports or brackets 18. While block 20 might be made of different forms and material, in practice it has been found to be very satisfactory to use a wooden block somewhat trapezoidal in plan as shown in Figs. 1 and 7. A tubular member 21 is provided and while this might take various forms, in the embodiment of the invention illustrated, a piece of cylindrical iron or steel pipe is used. Member 21 overlies block 20 and projects rearwardly therefrom over bumper 17. Pipe 21 has at its rear end a vertical hole 21a extending therethrough. A U-shaped bolt 22 extends over the top of pipe 21 having its side portions extending downwardly through block 20 and at either side of the bracket 18. Said portions extend through a tie plate 23 below bracket 18 and are provided with nuts 24. The U-shaped bolts thus very securely and rigidly connect members 18, 20 and 21. It will be seen that members 20 and 21 can thus be very easily and quickly connected to the automobile.

A rack or carrier 28 is provided and while this could take various forms, in the embodiment of the invention illustrated it is shown as having a floor or platform 28a. An angle bar 28b is shown as extending around the rear and sides of floor 28a to which said floor may be secured by the bolts or rivets 28h or other fastening means. Spaced vertical posts 28c are secured at their lower ends in platform 28a and rail or side members 28d are secured to posts 28c. While members 28d could be made of various forms, in the embodiment of the invention illustrated they are also shown as wooden bars rectangular in cross section. Beneath floor or platform 28a a channel member 29 is secured, the same extending between the side portions of angle bar 28b and having its flanges directed downwardly. Channel 29 is secured by bolts 32. A yoke shaped bar 30 is secured in channel 29 adjacent each end thereof by bolts or rivets 31, the same having its central portion spaced from the bottom of channel 29 and provided with a longitudinally extending slot 30a (see Fig. 4.) A yoke shaped bracket 33 similar to bracket 30 is also secured to the transversely extending portion of angle bar 28b adjacent each side thereof, said brackets being secured by rivets 34. Brackets 33 are longitudinally aligned with brackets 30 and are also provided with longitudinally extending slots 33a. A member 36 is provided at each side of the carrier and these members will be spaced so as to align with the tubular members 21 already described and will be shaped so as to engage telescopically with members 21. In the embodiment of the invention illustrated members 36 are shown as formed of iron or steel pipes which will readily slide into pipes 21. Members 36 are secured by headed and nutted bolts 37 which extend through slots 30a and 33a respectively and have their head portions disposed at the upper side of brackets 30 and 33 respectively. Said bolts extend vertically through members 36 and are provided below said members with nuts 38. It will be seen that members 36 can be moved transversely of the carrier and can be held in various positions by bolts 37. This is done to accommodate different makes of automobiles in which the brackets 18 may be differently located. Members 36 have free forwardly extending ends and are provided with vertical holes 36a adjacent their forward ends. Carrier 28 is shown as having a reinforcing bar 28f extending thereacross beneath floor 28a, said bar being secured to the bottom of angle bar 28b by rivets 28g. In order to hold members 36 and 21 in engaged position a pin 40 is provided having a somewhat pointed lower end and a circular handle portion 40a. A semi-cylindrical or yoke shaped clip 41 is secured to pin 40 through which said pin passes, the same being made of strong resilient material such as spring steel.

When the device is to be used the block 20 and member 21 will be secured to the bumper supporting brackets as shown and described. The carrier 28 will then be very firmly and securely supported by members 21 and brackets 18. This support will be very firm and secure as brackets 18 are connected to the frame 16 of the automobile. In order to prevent members 36 from moving out of members 21, the holes 21a and 36a are brought into alignment and pin 40 is inserted downwardly through said aligned holes. When this is done, the sets of clips 41 embrace pipe 21 as shown in Fig. 9. This prevents withdrawal or removal of pin 40 until such action is desired. The members 36 and 21 fit snugly so that the carrier is firmly supported so that there is no loose movement. The carrier is thus quiet when the car is in motion. It is apparent that the carrier will hold an immense amount of freight of various kinds. When the carrier is to be removed it is only necessary to lift pins 40 and then slide members 36 from members 21. In practice the carrier has been used to transport a weight of 500 pounds.

In Figs. 10 and 11 a slightly different construction for holding the members 36 is shown. In this construction said members will have secured thereto in any suitable manner as by welding, bars 45. Bars 45 will be provided with elongated central slots 45a. The bars will be of a size to be received in the channel member 29 and will also readily slide along and contact the bottom of angle 28b. Headed and nutted bolts 46 will extend through the platform 28a, the heads of said bolts being at the top of the platform and preferably engaging washers 27 countersunk into said platform. The bolts will extend through the slots 45a and the nuts on the bottom thereof will preferably contact washers 48 which extend across said slots. Bolts 50 can also extend through angle 28b and the platform from the top thereof and the nuts at the bottom will preferably engage washers 51. It will be seen that the members 36 with the bars 45 can be moved or slid transversely of members 29 and 28b so that said members 36 can be positioned as desired. The operation of the platform will otherwise be as above described.

From the above description it will be seen that I have provided a very simple and efficient structure of carrier for an automobile. The device is easily made from material which can be easily procured. The parts are capable of quick assembly and the device is easy and rapid in operation. The device has been amply demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A carrier structure for an automobile having a rear bumper and bumper supports adjacent the ends thereof having in combination, a block overlying each of said bumper supports, a round pipe overlying said block extending over said bumper and having a rearwardly projecting open end, means rigidly connecting said pipe, block and bumper support, a carrier comprising a floor portion, a member extending transversely of said floor portion beneath the same, a pair of cylindrical rods secured to said last mentioned member having free forward ends, the same being spaced so as to align with and shaped so as to telescopically fit within said pipes for supporting said carrier and means for holding said rods in said pipes, said carrier being supported wholly by said pipes and rods and removable by withdrawing said pair of rods from said pipes.

2. A carrier structure for an automobile having a rear bumper and bumper supports adjacent the ends thereof having in combination, a block overlying each of said bumper supports, a tubular member overlying said block extending over said bumper and having a rearwardly projecting open end, means rigidly connecting said tubular member, block and bumper support, a carrier comprising a floor portion, a member extending transversely of said floor portion beneath the same, a pair of members secured to said last mentioned member having free forward ends, the same being spaced so as to align with and shaped so as to telescopically fit within said tubular members for supporting said carrier, spaced vertical members along the sides of said floor portion, side rails carried by said last mentioned members extending along said side of said carrier and means for holding said tubular members and said pair of members from relative movement.

3. A carrier structure for an automobile having a rear bumper and spaced bumper supports adjacent the ends thereof having in combination, a block overlying each of said bumper supports, a tube overlying each of said blocks and disposed forwardly and rearwardly, the same having its rear end open, means rigidly connecting said tube, block and bumper support, a carrier comprising a platform, a pair of cylindrical members rigidly secured to said platform beneath the same and having free forwardly projecting ends, said cylindrical members being constructed and arranged to fit and to telescope into said tubes, the same and said platform being supported entirely by said tubes, a pin extending through each of said tubes and the member therein for holding said cylindrical members in position, said cylindrical members and carrier being removable upon withdrawal of said pin by a sliding movement out of said tubes.

PAUL L. HEMP.